Figure 1:
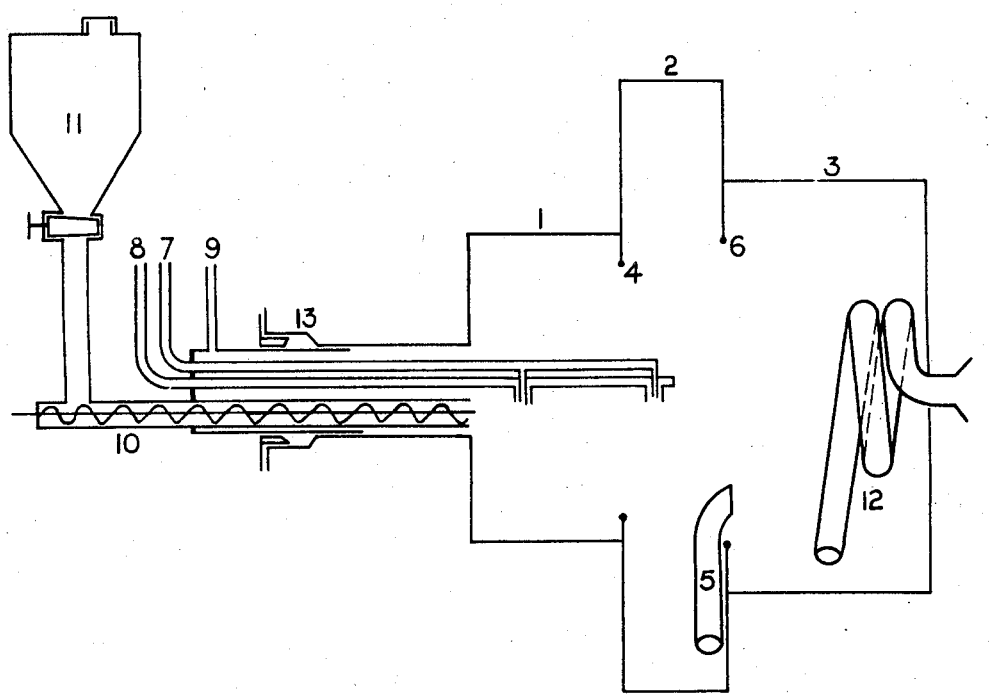

July 12, 1960  J. J. GRAY  2,944,887
MANUFACTURE OF METALS
Filed Feb. 7, 1956  2 Sheets-Sheet 1

FIG. I.

INVENTOR
James John Gray

BY Cushman, Darby & Cushman
ATTORNEYS

2,944,887

MANUFACTURE OF METALS

James John Gray, Widnes, England, assignor to Imperial Chemical Industries Limited, London, England, a corporation of Great Britain Filed Feb. 7, 1956, Ser. No. 564,070

Claims priority, application Great Britain Feb. 7, 1955

4 Claims. (Cl. 75—84.5)

This invention relates to the manufacture of metals and more particularly to the manufacture of titanium by the reduction of a titanium halide.

The production of metallic titanium by the reduction of a titanium halide, as for example titanium tetrachloride with an alkali or alkaline earth metal or magnesium, is well known and one method of manufacture is to reduce titanium tetrachloride with metallic sodium at temperatures between the melting point of sodium chloride and 1,000° C.

As the reaction between titanium tetrachloride and the reducing metal is strongly exothermic, sufficient heat is liberated during the course of reaction to melt the reducing metal chloride which is produced. After the reaction is completed and the products are allowed to cool it is found that the resulting mixture consisting of particles of titanium embedded in the reducing metal chloride has agglomerated into a single mass which adheres firmly to the sides of the reaction vessel. This gives rise to considerable difficulty in attempting to effect removal of the products from the reaction vessel for subsequent separation of the ingredients and the isolation of a pure titanium product. The sintered agglomerate is formed too rapidly to allow continuous withdrawal of the reducing metal chloride-titanium melt by tapping and it is generally necessary to have to remove the material by drilling or cutting after allowing the reactor to become cold. These obviously are cumbersome operations to carry out and they also preclude the operation of a continuous process for the manufacture of titanium and its isolation from the mixture of products obtained by the reduction process.

In one method of avoiding the tedious mechanical operation of withdrawing the adhering mass of products from the reaction vessel the reaction has been carried out at a lower temperature and in British Patent specification No. 717,930 a method is described and claimed of manufacturing titanium by reducing titanium tetrachloride with sodium in an inert atmosphere at a temperature between 200° C. and the melting point of sodium chloride while maintaining in the reactor an agitated non-adherent particulate bed of reaction products. The reaction can be carried out either in a stirred pot or in a fluidised bed and advantageously the temperature was between 480° C. and 620° C.

I have found an alternative method of overcoming the difficulties associated with the tendency of the reaction products to stick to the sides of the reaction vessel and this comprises carrying out the reaction at a comparatively high temperature between the melting point of the reducing metal salts and 1,000° C. while maintaining the reaction products in a state of motion in a revolving reaction vessel.

In a process for the manufacture of titanium by the reaction of titanium tetrachloride with an alkali metal or magnesium in an inert atmosphere the present invention comprises carrying out the reaction at a temperature between the melting point of the reducing metal chloride and 1,000° C. while maintaining the reaction products in a state of motion relative to the reaction vessel and thereafter isolating titanium therefrom.

Although any of the group of alkali metals or magnesium will serve efficiently as the reducing metal I prefer to employ metallic sodium but purely for convenience in the ensuing description the term "sodium" will be used to represent any of the alkali metals or magnesium.

I prefer to arrange for the products of reaction, titanium and sodium chloride, to be kept in continuous motion by causing the reaction vessel in which they are formed to rotate on a horizontal axis or at a slight angle to the horizontal and I have found surprisingly by this method that instead of the reaction products sticking to the sides of the reaction vessel they are obtained as a plurality of agglomerates which can easily be removed from the reaction vessel by suitable means while the salt is in a molten condition. Advantageously, the reaction vessel is rotated at a peripheral speed of between 50 and 150 feet per minute.

A notable advantage of the method of my invention is that the reaction can be operated continuously and that while titanium tetrachloride and sodium are fed continuously to the rotating vessel means may be employed to withdraw the separate agglomerates of product from the vessel as the reaction proceeds.

In order to improve the control over the size of the aggregates produced in the reactor, I have found it desirable to introduce a stream of small spherical pellets of titanium into the reactor as the reaction proceeds. This may be done by any known means and particularly suitable is by means of a screw conveyor fed from a feed hopper, purged with argon. Advantageously, the pellets are roughly spherical in shape and of ⅛ to ⅜ inch in diameter and I prefer to feed in to the reaction vessel an amount of titanium pellets equivalent to 1–5% of the weight of titanium tetrachloride fed in.

According to a further feature of my invention an apparatus adapted for the manufacture of titanium by the reduction of titanium tetrachloride with metallic sodium in an inert atmosphere comprises a cylindrical reaction vessel adapted to rotate on a horizontal axis having at one end separate inlet tubes through which titanium tetrachloride, sodium and inert gas may be admitted to the vessel and at the other end means for discharging the products from the reaction vessel.

In order to obtain the most advantageous results, however, I have found it desirable to establish further conditions. For example, it is necessary to avoid the formation of product aggregates which are too large to be withdrawn conveniently from the reaction vessel. In this connection I have found that small aggregates tend to adhere to larger ones of the ratio of diameters is in excess of approximately 4 to 1. The larger aggregates then grow rapidly to inconvenient dimensions and it is therefore desirable to avoid the coexistence at one place of large and small aggregates.

Again, in the simple procedure outlined above there is a tendency for unreacted sodium to be removed from the apparatus together with the titanium and the reducing metal salt unless a large excess of titanium tetrachloride is employed in the reaction.

I have now found that these limitations can be overcome in a simple and satisfactory manner by attaching to the cylindrical wall of the reaction vessel a number of circular diaphragms or orifice plates with their axes coincident with that of the cylindrical reaction vessel. These serve the purpose of dividing the solid and liquid contents of the reactor into a number of zones and the passage of solids from one zone to another can be made only through the central orifice of the dividing diaphragm, Appropriate means are employed for the removal of the products from one of the end zones, while the titanium tetrachloride and reducing metal are fed into one or more of the other zones, but advantageously not into the zone from which the products are withdrawn. There is thus a general flow of titanium towards the end of the reactor from which the product is removed. The orifice in each diaphragm is made slightly smaller than in the adjacent diaphragm, nearer to the discharge end of the reactor, thus ensuring that solids will pass through the orifice in one direction only, viz. towards the discharge end. I have found that with the above arrangement each zone contains titanium aggregates of a restricted range of sizes, and the adhesion of small aggregates to large ones is thereby avoided; while the small quantities of sodium which enter the zones near to the discharge end can be destroyed by maintaining only a slight concentration of titanium lower chloride in the metal salt leaving the reactor.

The diaphragms described above, besides functioning in the described manner, determine also the quantity of titanium retained in each zone, or the solids bed depth, and since the orifice sizes increase towards the discharge end, the bed depth decreases towards the discharge end of the reaction vessel. This may not always be desirable, and may be overcome by slightly tapering the reactor towards the feed end, or by changing the diameter stepwise. Variations of diameter can also be used to vary the peripheral speed of the reactor at different points along its length, to suit the requirements of the zones. If it is desired to follow a particular zone by one of smaller diameter it may be necessary to elevate the aggregate from one zone to the other mechanically.

I have also found, and this is a further feature of my invention, that it is desirable to roughen the inner surface of the reactor or certain zones of the reactor in order to prevent the agglomerated titanium from sliding around the drum, and also to ensure a rolling motion. Suitably this can be effected by narrow bars of metal welded to the inner surface of the drum parallel to the reactor axis or at a slight angle to it.

The titanium tetrachloride and the molten reducing metal may be introduced into the reactor by separate pipes so terminated as to direct the reactant streams into the desired zones of the reactor. One difficulty, however, is that deposits of titanium may be formed around the pipes, causing chokes and deflecting the reactant streams from the desired direction but we have found that this difficulty can be overcome by introducing the liquid reactant streams in two concentric jets, the molten sodium metal occupying the centre and the titanium tetrachloride the outer jet. This arrangement counteracts any tendency for titanium to form around the inner jet while around the outer jet there exists a concentration of titanium tetrachloride vapour which effectively destroys any titanium which may be deposited there and converts it to the lower chlorides of titanium.

A form of the discharging device which I have found particularly suitable and which constitutes a still further feature of our invention consists of a helical conduit of metal affixed to the end plate of the reactor, the axis of the helix coinciding with the axis of the reactor so that the helix is adapted to rotate with the reactor. A scoop shaped channel or conduit extends outwards at the end of the helix and is adapted to lift a portion of the reactor contents at each revolution and to deposit it inside the helical conduit. Each portion of product is then carried outwards by the rotation of the helix and is finally discharged from the outer end.

An important advantage of the above method of discharging product is that the removal of solid and liquid products is facilitated whilst the entry of air into the reactor may be prevented by the formation of a seal of molten salt which is maintained at each turn of the helix.

The invention will now be more particularly described with reference to Figure 1 of the drawings which illustrates one suitable arrangement, not to scale, for carrying out the invention.

The cylindrical reaction vessel is divided into three sections 1, 2 and 3, each of different diameter. The reactants are fed into section 1 and the products are withdrawn from section 3. An orifice plate 4 retains in section 1 a predetermined quantity of reaction products. The quantity in section 2 is determined by the design of the elevator channel 5 which transfers aggregates into section 3. Orifice plate 6 prevents solid or liquid products from returning to section 2. Molten sodium is introduced via pape 7, and liquid titanium tetrachloride via pipe 8. These terminate in concentric jets with the sodium jet occupying the inner position. Argon or other inert gas can be introduced through pipe 9 and small titanium pellets via the screw conveyor 10 from the hopper 11 which may be purged with argon or helium. The products of reaction are discharged from the reactor by means of the helical conduit 12, the inner end of which is extended to pick up aggregates and molten salt at each revolution of the reactor. The assembly of cylindrical sections 1, 2 and 3 together with the conduit 12 is supported on trunnions so that it is free to rotate on its own axis suitably by means of an electric motor, not shown in the diagram. A seal is made between the rotating parts and the stationary parts of the system by means of the stuffing box 13. A furnace is also provided, though not shown in the diagram, to heat up the reaction enclosure when starting the reactor and is constructed in sections which can be removed one by one as required. Once the reaction is in progress it is preferred to remove most or all of the sections, the temperature being then maintained by the heat of reaction occurring within. The furnace may conveniently be heated by means of gas, oil or electricity.

It will be appreciated that when the reactor is operating with all of the furnace sections removed, it will radiate heat freely to the surroundings. Since the surface temperature may approach 1,000° C. the rate of heat dissipation is very high, and must be balanced against the heat produced by reaction of the titanium tetrachloride with the sodium. Consequently the hourly throughput of a reactor in this condition is very large for any given size and this combined with the fact that production may be maintained without interruption over long periods results in substantial reduction of the cost of producing raw titanium.

Suitably the apparatus may be constructed of plain carbon steel, but we have found that owing to a significant degree of external oxidation the life of the equipment is then rather short, and it is therefore preferred to use heat-resisting steel, at least for those parts which operate at high temperature. There is some advantage to be gained also in the use of an outer shell of heat-resisting steel with an inner lining of carbon steel, since this results in a small tendency for titanium to alloy with the latter.

In the following example which illustrates but does not limit my invention reference will be made to Figure 2 of the drawings which illustrates one suitable apparatus for carrying out the invention:

*Example*

Figure 2:
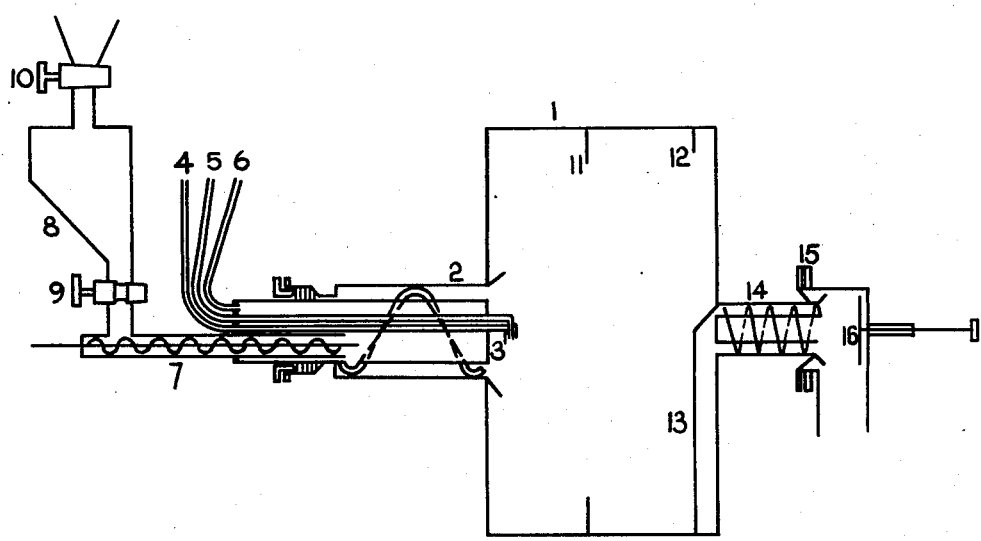

The reactor as shown in Figure 2 consisted of a horizontal cylindrical drum, 48 inches in diameter and 27 inches long internally, supported horizontally in such a way that it could be rotated on its own axis. A cylindrical extension 2 carried at its distal end a gland through which entered a wide pipe 3 which was fixed at its outer end and did not rotate. This pipe carried and supported feed pipes for sodium 4, titanium tetrachloride 5 and argon 6, together with a screw conveyor 7 which served to introduce small spherical granules of titanium to the reactor. The granules were fed in from the hopper 8, which could be replenished when necessary by closing the valve 9 and opening the valve 10. After falling from the conveyor 7, the pellets dropped through a hole in the underside of the pipe 3 and were then conveyed into the reactor by a helix fixed to the inner surface of the cylindrical extension 2.

To the inner surface of the reactor drum, 12 inches from the feed end, was welded a circular strip of steel plate 11 to form an orifice plate with a 40 inch diameter hole. A similar orifice plate with a 42 inch diameter hole was formed 3 inches from the discharge end of the drum. These served a double purpose. In the first place they maintained a suitable quantity of pellets in the reactor. Secondly, owing to the tendency for larger granules to ride on top of the rolling bed, they acted as classifiers passing the fully grown granules on to the discharge end of the reactor and retaining the small granules at the feed end. This is important for efficient utilisation of the granular feed material. Shallow lifters, not shown in the drawing, were also welded to the inner surface of the drum parallel to its axis to prevent the granular charge from sliding around the inside of the drum as it rotated.

At the discharge end of the reactor there was provided a channel 13 arranged approximately along a radius of the end so that as the reactor rotated the granules which had passed over the orifice plate 12 were picked up in the end of the channel. On further rotation they rolled along the channel towards the centre of the reactor end plate, and finally were fed into the screw conveyor 14, which discharged them into a suitable receiver. The conveyor comprised an outer tube of 6 inches internal diameter, and a concentric inner tube of 3 inches external diameter, the end of the inner tube being closed. In the annular space between the tubes was arranged a spiral partition which was welded to both inner and outer tubes. 5½ turns of the spiral were provided, and were pitched to form a channel 2 inches wide between each turn. Contact with the product receiver was made by means of the spring loaded rubbing seal 15, which served to maintain the argon atmosphere with which the receiver was filled.

50 lb. of titanium pellets and 50 lb. of granular sodium chloride were introduced into the cold reactor via hopper 8 and screw conveyor 7. The pellets were approximately spherical and $3/16$ inch in diameter. The reactor was flushed through with argon from tube 6 and then valve 16 was brought up against the end of conveyor 14 to make a temporary closure. The reactor was then rotated by mechanical means at a speed of 8 revolutions per minute, and was also heated by means of portable gas furnaces not shown in the diagram. Owing to thermal expansion during this stage, some argon was forced back along pipe 6 and escaped through a lute (not shown) which was arranged to maintain the reactor under a constant pressure of 4 inches water gauge. The cylindrical surface of the reactor was observed through an optical pyrometer, and when the temperature reached 850° C. titanium tetrachloride, liquid sodium and $3/16$ inch titanium pellets were introduced simultaneously at a low rate. The external heating was then reduced gradually and the feed rate of reactants was increased while maintaining the drum temperature in the range 840°–860° C. Finally, at the maximum feed rate, the temperature of the reactor was sustained chiefly by the heat evolved by the reaction of the titanium tetrachloride and sodium, only a small degree of external heating being retained for control purposes, and to keep the conveyor 14 sufficiently hot. In due course molten salt and titanium pellets passed over the orifice plate 12 and were transported by the channel 13 into screw conveyor 14. When equilibrium was established the conveyor was approximately half full of molten sodium chloride, which then prevented the escape of gases and vapours from the reactor through the conveyor. The valve 16 was then permanently withdrawn from the end of the conveyor, which continued to discharge the liquid and solid products of the reaction.

Over a period of one hour the following quantities of materials were passed into the reactor:

|  | Lb. |
|---|---|
| Titanium tetrachloride | 531 |
| Sodium | 254 |
| Titanium pellets $3/16$ inch diameter | 6 |

The products withdrawn from the reactor over the same period of one hour were leached with acidified water and yielded 134 lb. of titanium spheres and approximately 650 lb. of sodium chloride. The latter, as it emerged from the reactor contained a small quantity of dissolved titanium lower chlorides, and some finely divided titanium, but was substantially free from metallic sodium. The titanium product was in the form of approximate spheres averaging ½–⅝ inch diameter. These could be readily separated from the bulk of the salt by a gentle crushing process followed by screening which removed the salt as a powder. The titanium aggregates were unbroken and were found to contain 14% of salt. Some of the aggregates were compacted to form a consumable electrode and were then melted in the electric arc without further purification, using a water-cooled copper crucible and an atmosphere of argon. The resulting titanium button had a hardness of 138 diamond pyramid number with a hydrogen content of 0.001%.

What I claim is:

1. A continuous process for the production of titanium which comprises reacting titanium tetrachloride with a reducing metal selected from the group consisting of an alkali metal, magnesium and mixtures of said metals in an inert atmosphere and at a temperature between the melting point of the reducing metal chloride and 1000° C., said reaction taking place within a continuously rotating reaction vessel, said vessel rotating about its substantially horizontal axis at a peripheral speed of between 50 and 150 feet per minute and sufficient to form a plurality of agglomerates by the rolling action and the tackiness of the titanium, which agglomerates can be easily removed from the reaction vessel along with the molten salt, and continuously withdrawing the reaction products from said rotating vessel, said titanium product being readily separated from the bulk of the salt by a gentle crushing process.

2. The process of claim 1 wherein the reducing metal is an alkali metal, the titanium tetrachloride being used in excess.

3. Process of claim 2 wherein the titanium pellets are added in an amount between 1 and 5% by weight of the titanium tetrachloride said pellets having a roughly spherical shape and a diameter between ⅛ and ⅜ inch.

4. A continuous process for the production of titanium which comprises reacting titanium tetrachloride with a reducing metal selected from the group consisting of an alkali metal, magnesium and mixtures of said metals in an inert atmosphere and at a temperature between the melting point of the reducing metal chloride and 1000° C., said reaction taking place within a reaction vessel continuously rotating about a substantially horizontal axis at a peripheral speed up to 150 feet per minute and sufficient to form a plurality of agglomerates containing titanium by the rolling action and the tackiness of the titanium, said reaction being carried out in the presence of pellets of titanium added to promote and control the formation of said agglomerates containing titanium product, which agglomerates can be easily removed from the reaction vessel along with the molten salt, and continuously withdrawing the reaction products from said rotating vessel, said titanium product being readily separate from the bulk of the salt by a gentle crushing process.

References Cited in the file of this patent

UNITED STATES PATENTS

| | | |
|---|---|---|
| 1,877,961 | Pokorny | Sept. 20, 1932 |
| 2,091,087 | Wempe | Aug. 24, 1937 |
| 2,395,286 | Merle | Feb. 19, 1946 |
| 2,411,873 | Firth | Dec. 3, 1946 |
| 2,607,674 | Winter | Aug. 19, 1952 |
| 2,709,833 | Wiklund | June 7, 1955 |
| 2,792,438 | Dunn | May 14, 1957 |

FOREIGN PATENTS

| | | |
|---|---|---|
| 253,161 | Great Britain | June 7, 1926 |
| 686,845 | Great Britain | Feb. 4, 1953 |
| 717,930 | Great Britain | Nov. 3, 1954 |
| 1,088,006 | France | Sept. 1, 1954 |
| 68,626 | Denmark | Feb. 14, 1949 |